United States Patent
Sherman

[11] 3,851,233
[45] Nov. 26, 1974

[54] ELECTRO-KINETIC, PARALLEL-SERIES, DYNAMIC BRAKE FOR ALTERNATING CURRENT MOTORS

[76] Inventor: Lawrence V. Sherman, 12925 N.E. 131 Pl., Kirkland, Wash. 98033

[22] Filed: June 22, 1972

[21] Appl. No.: 265,233

[52] U.S. Cl. ............................... 318/212, 318/375
[51] Int. Cl. ............................................ H02p 3/24
[58] Field of Search .......... 318/204, 212, 364, 373, 318/375

[56] References Cited
UNITED STATES PATENTS
| | | | |
|---|---|---|---|
| 3,313,992 | 4/1967 | Bohn.................................. | 318/212 |
| 3,340,449 | 9/1967 | Elliott................................ | 318/212 |
| 3,412,304 | 11/1968 | Baum et al...................... | 318/212 X |

*Primary Examiner*—Robert K. Schaefer
*Assistant Examiner*—W. E. Duncanson, Jr.

[57] ABSTRACT

An electro-kinetic dynamic brake very rapidly stops alternating current motors. The electrical circuits of this brake include a parallel-series circuit utilizing inductive reactors, usually of the air-core type, coupled to a full-wave rectification means and interconnected with existing A.C. motor circuits so as to be in parallel with the A.C. line supply and motor control. When the motor is in an ON condition and A.C. power is being supplied to operate the motor, this A.C. power maintains the dynamic brake circuit in a parallel and nonconductive state. If the motor circuit is switched manually or automatically to an OFF condition, the dynamic brake circuit automatically transfers from the parallel and nonconductive state to a series D.C. dynamic braking-power state, having certain inherent current limiting characteristics.

Auxiliary elements are added to the parallel-series circuit of the dynamic brake to implement a non-conductive state in the dynamic brake circuitry when the A.C. motor being braked reaches a stopped condition and they maintain that non-conductive state while the A.C. motor circuit continues in an OFF condition. When operated in a manual control mode, passive circuit elements, such as diodes, are used in the brake circuit configuration, and when operated in an automatic control mode, active circuit elements, such as silicon-controlled-rectifiers, are utilized in the brake circuit configuration. Also auxiliary elements may be included to modify the brake circuit operation, when other circuit control means are required, i.e., timed relays, limit switches, sensors, etc.

Moreover the brake circuit is omnidirectional for A.C. motor applications which require dynamic braking in forward or reverse rotational direction.

In the preferred embodiment, air-core reactors, or aircore reactors modified by the addition of magnetizable iron, maintain a relationship with a full-wave rectification means. The latter, in turn, maintains a relationship with the A.C. motor and its circuitry, and as in all embodiments, no electrical or mechanical interlocks are used between the A.C. motor and the D.C. dynamic brake.

7 Claims, 3 Drawing Figures

ELECTRO-KINETIC, PARALLEL-SERIES, DYNAMIC BRAKE FOR ALTERNATING CURRENT MOTORS

BACKGROUND

A patent search in the U.S. Pat. Office revealed no U.S. Pat. which disclosed any like or similar circuits and elements thereof of general background interest; however, U.S. Pat. Nos. 3,340,449 and 3,412,304 are of interest.

As indicated in these patents, it is well known that D.C. current power will act as a braking medium or force in stopping various types of A.C. motors and many attempts have been made to develop suitable methods of D.C. current dynamic braking controls of A.C. motors. Traditional means include the use of bulky transformers to develop a low-voltage fullwave D.C. power and in turn large magnetic contactors are needed to interrupt the difficult to extinguish D.C. currents. Some newer type D.C. dynamic braking means, often depend upon the use of silicon-controlled-rectifiers to control D.C. braking power supplied to an A.C. motor.

Some difficulties encountered in existing brakes and their circuits are as follows:

1. Excessive size and weight of components;
2. Arcing of contacts which result in shortened life of the brakes;
3. Limited application, caused by difficulty in applying such dynamic braking circuitry to newer solid-state controllers as now used on A.C. motors, because of intense generative transient conditions during switching;
4. Limited application because of difficulties inherent with installing braking circuitry on motor control equipment which is operated from simple ON-OFF switches;
5. Difficulty caused by necessity for interlocking the motor A.C. power means from the D.C. dynamic braking means to prevent destruction of equipment;
6. Complex installation problems caused by weight, size and number of interconnections; and
7. Intense noise-interference-radiation caused by high-level switching of silicon-controlled-rectifier circuits.

There has therefore, in the past, been a limited use of dynamic braking devices, because of these difficulties. Moreover the cost of D.C. dynamic braking has been high when compensating elements and circuitry are used to reduce the effect of the difficulties described above. In contrast, this electrokinetic, parallel-series dynamic brake when operated reduces the intensity and complexity of such difficulties or problems and results in greater use of dynamic braking devices for A.C. motors leading to increased industrial production, safety, economy and convenience.

Previous dynamic brakes often included magnetic contactors to control the flow of D.C. current to an A.C. motor, so it would only receive D.C. current after the normal A.C. current to the motor was interrupted. Such magnetic contactor control is often referred to as an interlock system or condition. These previous interlock elements and circuits were often costly, difficult to connect by any user, and often failed.

In contrast no interlock elements or circuits are used and when electro-kinetic, parallel-series dynamic brake is utilized:

1. The customer's installation is simpler because only four electrical leads are connected to complete installation and operation; two of them are leads for power input, and two of them are leads for dynamic braking power output;
2. There is no need for a magnetic starter in the A.C. motor control circuit, as this dynamic brake is just as effective when tied into a motor switching circuit;
3. There is inherent protection of the dynamic braking circuit from various fault-prone configurations of motor starting equipment such as motor contactors or switching devices which otherwise would cause considerable difficulty in solid-state electronic equipment contained in the embodiments of these dynamic braking devices;
4. There is inherent protection of A.C. motors or motor starting equipment from accidental or transient overcurrent faults in this dynamic braking circuit;
5. There is inherent protection of the dynamic braking circuitry from some momentary fault or over-voltage or overcurrent condition emanating within the braking circuitry, caused from an external or internal problem such as transients from motor circuits, from a fault associated power line equipment, or from a fault otherwise associated with the dynamic braking system which affects its normal operating and control conditions;
6. There are inherent advantages in this electro-kinetic, parallel-series, dynamic brake which are realized as the result of eliminating the necessity for an interlocking of this dynamic braking system and the A.C. motor running system, because this dynamic braking system is inherently fail-safe in a fault condition and unaffected by A.C. motor running conditions; and
7. There are inherent advantages gained from this dynamic braking system, because no need exists for a user to wait for the braking means to complete an ON cycle before the user can successfully restart his A.C. motor equipment. He often uses the A.C. motor in a jog mode, as this dynamic brake shuts itself automatically down through operation of its sensing circuitry, when A.C. line power is reconnected to the A.C. motor by operation of the motor switch control means.

SUMMARY OF INVENTION

An electro-kinetic, dynamic brake very rapidly stops alternating current motors. It interposes means between the A.C. motor equipment and its own D.C. dynamic braking equipment which suppresses transients, prevents catastrophic shorts and faults between motor A.C. power and dynamic brake D.C. power, and lessens the need for expensive interlocking devices. Such interposing means center on the utilization of air-core reactors which do the following:

1. limit the A.C. power from getting back into the dynamic braking circuitry and to prevent power from destroying elements and components of the dynamic brake prior to a shutdown of the brake circuit upon detection of a motor start mode;

2. prevent excessive D.C. power from the dynamic brake destroying the A.C. motor or motor control equipment in the event of malfunctions or faults in the dynamic brake circuitry before circuit interrupting means could activate in the dynamic brake device;

3. prevent blown fuses or wiring in the A.C. power supply to the A.C. motor in the event of simultaneous actuation of both A.C. motor power and D.C. dynamic braking;

4. conduct D.C. power from the dynamic braking means to the motor while at the same time limiting any A.C. power supplied before the A.C. motor had stopped, which would tend to flow from the motor to the dynamic braking circuitry before shutdown of the dynamic brake could occur; and 5. greatly reduce radio-frequency-noise which normally results in turning ON silicon-controlled-rectifiers applied to large A.C. motors.

This parallel-series interconnected, electro-kinetic, dynamic brake requires only four electrical leads for interconnection with motor circuits. Two of these leads connect the motor power supply to obtain A.C. power which is converted to full-wave D.C. power for dynamic braking, and two of these leads connect to the A.C. motor for supplying the dynamic braking power to the A.C. motor. These four electrical leads continue and are circuited through suitable power-limiters which are the air-core reactors which also serve as the major fail-safe elements in this dynamic brake.

Moreover, this dynamic brake senses a motor starting condition through these same D.C. power leads which are connected through these power-limiting reactors to furnish D.C. power to the motor. As a result the D.C. brake power is shut down once a motor starting condition is sensed. Furthermore, in the event of a dynamic brake fault resulting in an automatic shutdown of braking power from the opening an internal fuse or circuit-breaker in the D.C. dynamic brake, it fails safe and the A.C. motor still functions without the brake. Production shutdowns are avoided, except where an A.C. motor cutout must be provided for safety in the event of D.C. dynamic brake failure.

DESCRIPTIONS OF THE DRAWINGS

DESCRIPTION OF PREFERRED EMBODIMENTS

Basic Circuitry

Figure 1:
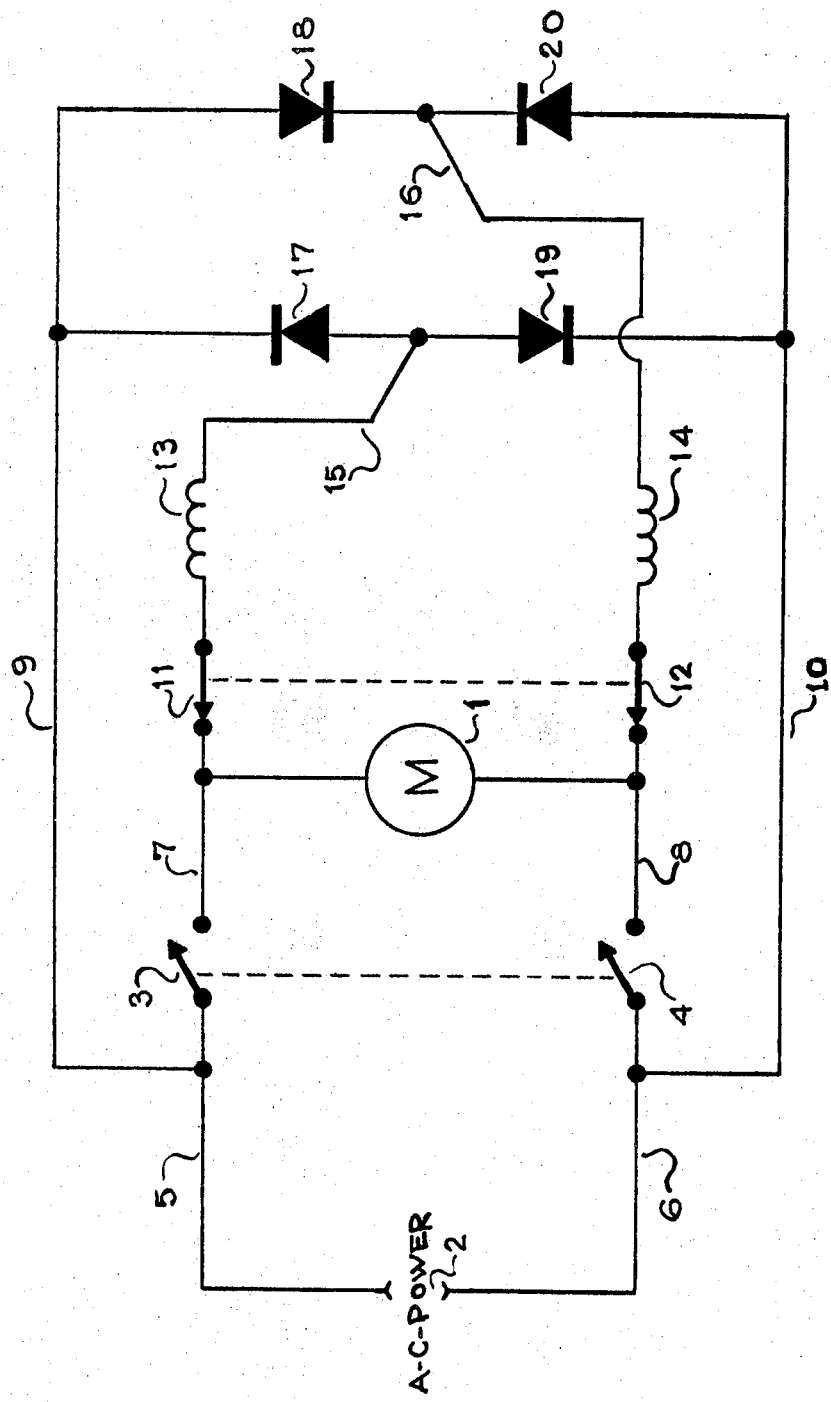
FIG. 1 is the basic circuitry of the parallel-series dynamic brake.

In the basic circuitry shown in FIG. 1 of this dynamic brake, an alternating current induction motor 1 is connected to an alternating current power supply 2 through power ON-OFF switches 3 and 4, power input leads 5 and 6, and power input leads 7 and 8. Switches 3 and 4 could also be contacts in another form such as an alternating current contactor or other interruptive means which serve as a means for ON-OFF control of an alternating current induction motor. In specific reference to the dynamic brake portion of the overall circuits, the braking circuit consists of inductive reactors 13 and 14, rectifiers 17, 18, 19 and 20, power input leads 9 and 10, and direct current power output leads 15 and 16, which connect to inductive reactors 13 and 14, through ON-OFF switches 11 and 12, to the alternating current motor 1.

As connected in FIG. 1, A.C. motor 1 is drawing no power from the alternating current source 2 because switches 3 and 4 are in an open condition. Under braking, the motor 1 is drawing full-wave direct current from the bridge rectifiers 17, 18, 19 and 20 through inductive reactors 13 and 14, as switches 11 and 12 are closed. Alternating current power is being supplied through leads 9 and 10 from leads 5 and 6; and rectified into full-wave direct current by rectifiers 17, 18, 19 and 20 and then presented across lines 7 and 8 to motor 1 through leads 15 and 16, inductive reactors 13 and 14, and ON-OFF switches 11 and 12. The magnitude of direct current power causes the induction-type alternating current motor 1 to decelerate and finally stop. The magnitude of the pulsating direct current power provided to the motor 1 by rectification in bridge rectifiers 17, 18, 19 and 20 is controlled by increasing or decreasing the number of turns on inductive reactors 13 and 14. The pulsating nature of the full-wave direct current power causes a reactance to be set up in inductive reactors 13 and 14.

Any direct current dynamic braking power to A.C. motor 1 is limited by a combination of inductive reactance and ohmic resistance to a magnitude sufficiently low, so that any direct current power allowed to flow through the alternating current circuit and A.C. motor 1 will at all times do so without damaging either the alternating current line circuitry or the direct current brake circuitry. When motor control switches 3 and 4 close, alternating current power completely overrides the direct current power, because inductive reactors 13 and 14 limit what would otherwise be a serious fault in the system.

When switches 11 and 12 are employed in the system, either by some automatic means or by manual switching, the reactance in inductive reactors 13 and 14 is of a reactance value allowing greater pulsating direct current power to flow during those times when it is desired to stop the alternating current motor 1. In preferred embodiments the reactive value of inductive reactors 13 and 14 is varied in order to control the amount of direct current power which is presented to induction motor 1, so the alternating current induction motor 1 may be stopped as rapidly as desired.

Advanced Circuitry.

Figure 2:
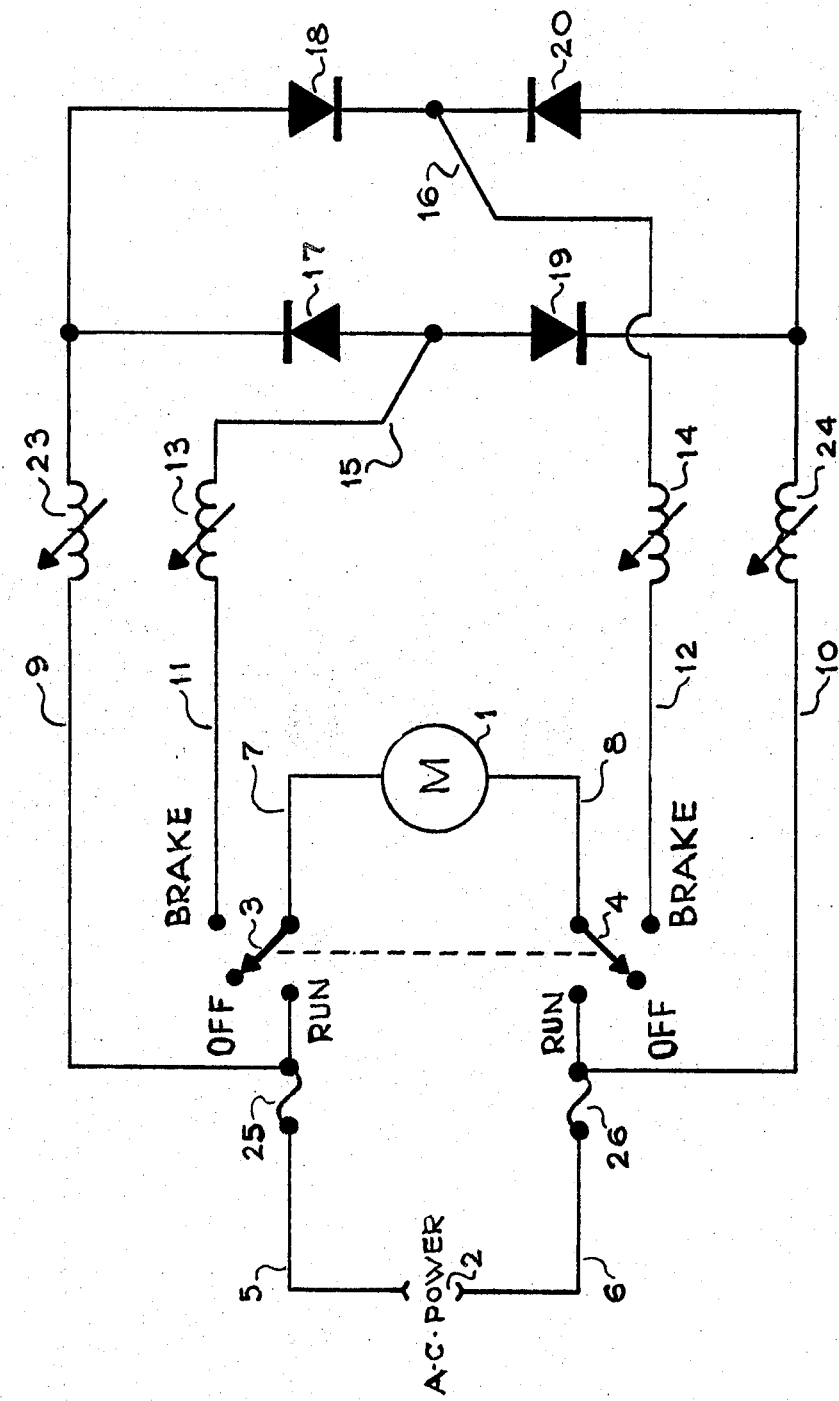
FIG. 2 is the advanced circuitry of the parallel-series dynamic brake, inclusive of manual controls and power adjustors.

In the advanced circuitry shown in FIG. 2 of this dynamic brake an alternating current motor 1 is connected to an alternating current power source 2 through leads 5 and 6, fuses 25 and 26, three-position switches 3 and 4, and through leads 7 and 8. This portion of FIG. 2, represents the alternating current induction motor control circuit, as previously shown in FIG. 1. In reference to the dynamic brake portion of the overall circuits, the direct current dynamic braking circuitry consists, in part, of the major circuit components represented by leads or conductors 9 and 10 coming from the alternating current source 2 and going through adjustable inductive reactors 23 and 24 to bridge rectifiers 17, 18, 19 and 20, which feed lines 15 and 16, to adjustable inductive reactors 13 and 14, back through lines 11 and 12 to the alternating current induction motor 1. This circuitry is similar to that of FIG. 1, except the paths are through switches 3 and 4.

Manual adjustment of adjustable inductive reactors varies the intensities of direct current power for more or less selective rapid braking of the alternating current induction motor 1. Three-position switches 3 and 4 are manual control means, representative of any other common means of three-position switching, for the purpose of placing the related motor run and dynamic braking circuits in their respective motor run, motor braking, or OFF condition. These three-position switches 3 and 4 have motor run and OFF stable resting positions with their motor braking position being a spring-loaded unstable position, so when manual action is removed, the switches 3 and 4 will automatically return to the OFF position.

Automatic Circuitry

Figure 3:
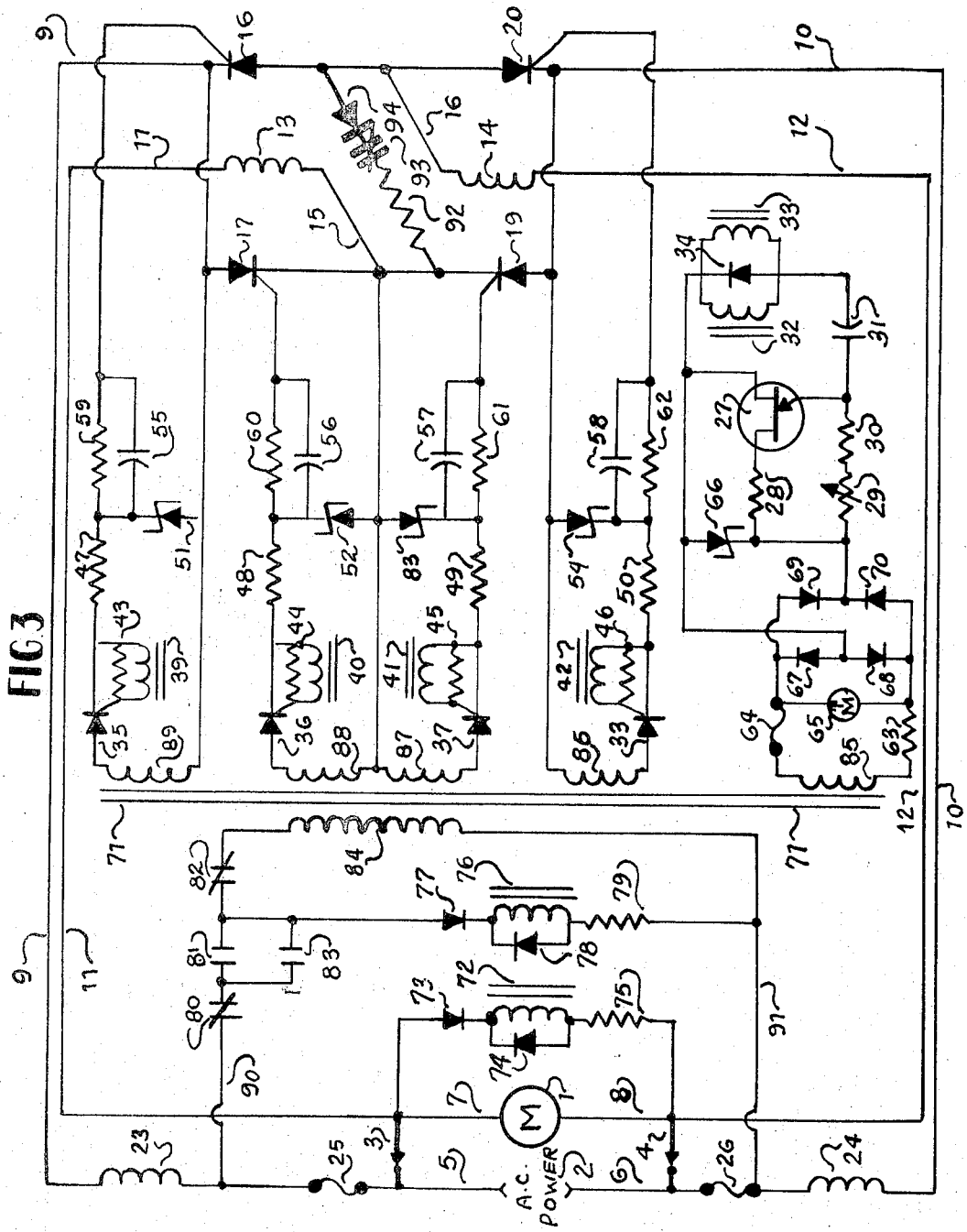
FIG. 3 is the automatic circuitry of the parallel-series dynamic brake, inclusive of power adjustors and automatic timers.

In the automatic circuitry shown in FIG. 3 of this dynamic brake, A.C. motor 1 is connected to an alternating current power source 2 through leads 5 and 6 and fuses 25 and 26 to switches 3 and 4 through leads 7 and 8. This portion of the circuitry is similar to the alternating current induction motor control circuit as illustrated in FIG. 1. In reference to the dynamic brake portion of the overall circuits, the direct current dynamic braking circuitry consists, in part, of the major circuit elements represented by leads 9 and 10 coming from the alternating current source 2 and going through inductive reactors 23 and 24 to bridge rectifiers 17, 18, 19 and 20, which feed conductors 15 and 16, to inductive reactors 13 and 14; and back through lines 11 and 12 to the alternating current induction motor 1. In this circuitry, silicon-controlled-rectifiers 17, 18, 19, and 20 are used in the place of rectifiers 17, 18, 19 and 20 which are used in the circuitry shown in FIG. 1, in order to allow a selective setting of various intensities of direct current power for more or less rapid braking of alternating current induction motors. A dynamic brake which may be so adjusted in its effectiveness from time to time is often wanted.

The control circuitry for these silicon-controlled-rectifiers 17, 18, 19 and 20 has many components. One is a gate pulsing circuit which is provided for switching silicon-controlled-rectifiers 17, 18, 19 and 20 for various angles or degrees of each alternating current line cycle. This gate pulsing circuit consists of unijunction 27, current limiting resistor 28, potentiometer 29, current limiting resistor 30, pulsing capacitor 31, and pulsing transformers 32 and 33, which are the primaries for pulsing transformer secondaries 39, 40, 41 and 42 located in the gate circuits of silicon-controlled-rectifiers 17, 18, 19 and 20. The power supply needed for this gate pulsing circuit is formed by voltage limiting zener rectifier 66, current limiting resistor 63, fuse 64 and full-wave bridge rectifiers 67, 68, 69 and 70. This power supply forms a positive pulsing voltage capable of driving unijunction 27 into an ON condition for both positive and negative phases of the alternating current line, which capability is necessary of full-wave direct current power is to be provided by silicon-controlled-rectifiers 17, 18, 19 and 20. The secondary side of the silicon-controlled-rectifiers 17, 18, 19 and 20 consists of gating silicon-controlled-rectifiers 35, 36, 37 and 38, current limiting resistors 43, 44, 45, 46, 47, 48, 49, 50, 59, 60, 61, and 62, gate pulsing transformer secondaries 39, 40, 41 and 42, zener rectifier voltage limiters 51, 52, 53, 54, gate pulsing capacitors 55, 56, 57, 58, and main gate pulsing transformer 71.

Also in the control circuitry for these silicon-controlled-rectifiers 17, 18, 19 and 20, there is a gate timing and automatic shutdown control circuit. It consists of relay coils 72 and 76 and the associated elements which are direct current rectifiers 73, 74, 77 and 78, current limiting resistors 75 and 79, relay contacts 81, 82 and 83, timing motor drive 65, timing switch contact 80, and main gate control transformer 71. This main gate control transformer 71, in turn, consists of primary power input coil 84 and secondaries for gate pulsing power supplies 86, 87, 88, 89 and for the unijunction gate pulsing control circuit power input coil 85.

In certain embodiments of this automatic circuitry of this dynamic brake, where it is installed to stop higher power alternating current motors, any loss of efficiency, which would otherwise be observed because of the A.C. motor's inherent back electromotive force, is avoided by including additional components and circuitry, which shunt this back electromotive force through a closed motor circuit during the operation of the dynamic brake. These components and circuitry include contact means 93 which is activated by relay 72, and which is in a normally open position when the A.C. motor is in a running condition with A.C. power being applied to the motor. When the motor is turned off by operating switches 3 and 4, relay 72 de-energizes, causing contact 93 to close thereby creating a shunt path followed by the back electromotive force generating current from the A.C. motor 1, through leads 7 and 11, reactor 13, lead 15 to current limiter 92, through closed contact means 93, rectifier 94, lead 16, reactor 14, leads 12 and 8, and back to A.C. motor 1.

Operation of Automatic Circuitry

The automatic circuitry of the dynamic brake as illustrated in FIG. 3 functions as follows. All circuits remain in an OFF condition until such time as alternating current induction motor 1 becomes activated to an ON state by the closing of motor run switches 3 and 4. As these switches 3 and 4 close, the A.C. motor 1 starts and alternating current power is also fed to the coil of relay 72 through rectifier 73 and current limiting resistor 75. Relay 72 actuates, closing contact 81 and opening contact 82. This permits alternating current power to flow through current limiting resistor 79 and relay coil 76 and rectifier 77. Relay 76 actuates and closes contact 83 which places relay 76 in a latched mode; but because contact 82 is open, main gate pulsing transformer is not activated, and all other conditions will remain as they were before the activation of the alternating current induction motor 1, upon closing power switches 3 and 4.

When motor run switches 3 and 4 are opened to the A.C. motor circuit after an operational period, the following circuitry operations take place. Alternating current power is removed from the motor circuit and relay 72. Relay 73 deactivates and opens contact 81 and closes contact 82, creating a pathway for the flow of alternating current from the alternating current source 2 through line 5 and line 90, closed timing contact 80, closed contacts 83 and 82, and on to the primary 84 of the main gate pulsing transformer 71, and then returning through lines 91 and 6 to alternating current source 2. The main gate pulsing transformer 71 energizes secondary 85 to operate timing motor drive 65 and the unijunction 27 pulsing circuits. In addition, the secondaries 86, 87, 88 and 89 are transferring power to the gate circuits of silicon-controlled-recitifiers 17, 18, 19 and 20. The alternating current power for unijunction 27 will enter the circuit through current limiting resistor 63, be rectified into full-wave direct current by rectifiers 67, 68, 69 and 70 and be presented to current limiting resistor 28 and potentiometer 29, which are in parallel with zener rectifier 66, which is included for the purpose of limiting the voltage to a safe potential for unijunction 27.

Depending upon the setting of potentiometer 29, which is in series with current limiter 30, the unijunction 27 will fire at a different angle or degrees of the alternating current power frequency on both the positive and negative phases. The firing of unijunction 27 is presented to pulse transformer primaries 32 and 33 through pulse capacitor 31. The pulses produced by unijunction 27 will appear across the pulse transformer secondaries 39, 40, 41, and 42. These pulses will in turn cause gate silicon-controlled-rectifiers 35, 36, 37 and 38 to conduct because they are now receiving power from the primary control transformer 71 secondaries 86, 87, 88 and 89.

Silicon-controlled-rectifiers 35, 36, 37 and 38 are connected to the low voltage secondaries of the primary control transformer 71 to obtain hard driving current to activate the gates of the power silicon-controlled-rectifiers 17, 18, 19 and 20, which would otherwise have difficulty activating into a highly inductive circuit such as is formed by alternating current induction motor 1 and inductive reactors 13 and 14, by employing less positive firing circuits. When silicon-controlled-rectifiers 35, 36, 37 and 38 conduct, they provide alternating current power from secondaries of the main control transformer 71 to gates of silicon-controlled-rectifiers 17, 18, 19 and 20 through current limiting resistors 47, 48, 49, 50, 59, 60, 61 and 62. Zener rectifiers 51, 52, 53 and 54 limit the voltage of the main control transformer 71 secondaries 86, 87, 88 and 89 to an even, safe level needed to provide continuous firing of silicon-controlled-rectifiers 17, 18, 19 and 20 throughout the remainder of the half cycle in which activation occurs, in order to make certain that silicon-controlled-rectifiers 17, 18, 19 and 20 do not revert to their OFF state in the highly inductive circuit including the alternating current induction motor 1 and inductive reactors 13 and 14. Capacitors 55, 56, 57 and 58 are used in the gate circuits of silicon-controlled-rectifiers 17, 18, 19 and 20 for the purpose of providing an initial spiked pulse to silicon-controlled-rectifiers 17, 18, 19 and 20, in order to properly start their conduction cycle. The primary 84 of the main control transformer is wound such that it will supply proper voltage to silicon-controlled-rectifier gates for any voltage from the alternating current power source 2 inclusive of 110/120 volts A.C., 220/240 volts A.C., 440/480 volts A.C., or 550/600 volts A.C.

During All Operational Periods Circuits and Components are Protected and the Dynamic Brake Fails Safe If the alternating current line switches 3 and 4 are closed to restart the motor 1, before the timing contact 80 has opened and relay 76 de-energizes, there will still be direct current power being supplied through the inductive reactors 13 and 14 to the A.C. motor 1. As previously described the inductive reactors 13 and 14 and 23 and 24, are designed to protect the direct current dynamic braking circuit until timing contact 80 and relay 76 contact 83 have opened and relay 76 has successfully de-energized, thus opening the control circuit to direct current silicon-controlled-rectifiers 17, 18, 19 and 20.

Also, if the main alternating current power switches 3 and 4 are closed before relay coil 76 de-energizes, power will quickly be applied through rectifier 73, surge resistor 75 to relay coil 72 which will then quickly actuate opening contact 82 with the immediate de-energizing of main control transformer 71, causing, in turn, the gates of silicon-controlled-rectifiers 35, 36, 37 and 38 to lose firing power, further causing silicon-controlled-rectifiers 17, 18, 19 and 20 to stop conduction of full-wave direct current power, thereby shutting down the direct current dynamic braking system, until such time as the alternating current induction motor 1 has its alternating current power removed once more by operation of power switches 3, 4.

Embodiment Changes

Throughout all embodiments modifications are possible. For example where a dynamic brake is to be adjustable over an effective range, the timing motor drive 65 has an inherent time cycle which may be manually or automatically adjusted to set desired dynamic braking time periods. This timing circuit described and illustrated for controlling dynamic braking periods, is representative of other known timing control means which could be used. Where the timing is to be set for all time a lower cost approach, such as the incorporation of a time delay relay would be used. As illustrated and described adjustment means are provided with reference to the silicon-controlled-rectifiers, so the direct current outputs may be adjusted to meet different braking demands. However, where only an initial braking output was to be demanded, again a lower cost approach would be followed using fixed or set reactors. This might be done where specified A.C. motors and dynamic brakes were pre-assembled to match a definite specification.

I claim:

1. A dynamic brake to create, from an alternating current power source direct current power employed in stopping an alternating current induction motor, wherein the brake and the motor are always connected together in circuitry referred to as parallel-series circuitry as the brake is always inherently self protected from destruction by operation of the A.C. motor and the A.C. motor is always inherently protected from destruction by operation of the dynamic brake, the dynamic brake circuitry being in parallel pre-operational status during the running of the A.C. motor and being in a series operational status during the braking of the otherwise coasting A.C. motor, comprising a. leads adaptable for conducting alternating current power through inductive reactors to bridge arranged silicon-controlled-rectifiers;

b. inductive reactors positioned in the alternating current leads serving a surge current protective function and a smoothing flow current modifying function;

c. silicon-controlled-rectifiers arranged in a bridge circuit to create pulsing direct current power, when triggered, from the alternating current power coming from the inductive reactors;

d. leads for conducting the pulsing direct current power through other inductive reactors to an alternating current induction motor supplying the stopping power to the otherwise coasting A.C. motor;

e. other inductive reactors positioned in the pulsing direct current leads serving a surge current protective function and a smoothing flow current modifying function; and f. a triggering control circuit means with components and leads thereof for triggering the silicon-controlled-rectifiers.

2. A dynamic brake, as claim in claim 1, comprising, in addition, a power amplification circuit in the triggering control circuit means.

3. A dynamic brake, as claimed in claim 1, comprising, in addition, a timing control circuit means with components and leads thereof for ultimately controlling the availability of alternating current to the silicon-controlled-rectifiers.

4. A dynamic brake, as claimed in claim 2, comprising, in addition, an adjustable timer motor control in the timing control circuit means.

5. A dynamic brake, as claimed in claim 1, comprising, in addition, an adjustable means in the triggering control circuit means to variably control the cycle output of the silicon-controlled-rectifiers thereby controlling the stopping force applied to the otherwise coasting A.C. motor.

6. A dynamic brake, as claimed in claim 1, comprising, in addition, in the triggering control circuit means:

1. a power amplification circuit;
2. an adjustable timing control circuit means to determine the length of time of the overall period during which alternating current is supplied to the silicon-controlled-rectifiers
3. an adjustable means to variably control the cycle output of the silicon-controlled-rectifiers thereby controlling the magnitude of the stopping force applied to the otherwise coasting A.C. motor.

7. A dynamic brake, as claimed in claim 6, comprising, in addition, transformer means to receive alternating current power and distribute the power throughout triggering control circuit means.

* * * * *